United States Patent
Kimura

(10) Patent No.: US 11,435,551 B2
(45) Date of Patent: Sep. 6, 2022

(54) IMAGING DEVICE, IMAGING SYSTEM, AND RECORDING MEDIUM

(71) Applicant: CANON KABUSHIKI KAISHA, Tokyo (JP)

(72) Inventor: Yasunori Kimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 16/827,867

(22) Filed: Mar. 24, 2020

(65) Prior Publication Data

US 2020/0326503 A1    Oct. 15, 2020

(30) Foreign Application Priority Data

Apr. 15, 2019 (JP) .............................. JP2019-076846

(51) Int. Cl.
G02B 9/06 (2006.01)
G02B 7/10 (2021.01)

(52) U.S. Cl.
CPC ................. G02B 9/06 (2013.01); G02B 7/10 (2013.01)

(58) Field of Classification Search
CPC ............ G02B 9/06; G02B 7/10; G02B 7/023; G02B 7/102; G02B 7/021; G02B 7/02; H04N 5/2254; H04N 5/23296; H04N 5/23287; H04N 5/2253; H04N 5/225; H04N 5/2251
USPC ....................................................... 396/427
See application file for complete search history.

(56) References Cited

U.S. PATENT DOCUMENTS

| 6,977,676 | B1 | 12/2005 | Sato et al. |
| 9,208,668 | B1 | 12/2015 | Wu et al. |
| 2016/0335501 | A1 | 11/2016 | Huang |
| 2016/0358011 | A1* | 12/2016 | Watanabe .......... A61B 5/02416 |
| 2019/0387180 | A1* | 12/2019 | Ogata .............. H04N 21/42204 |

FOREIGN PATENT DOCUMENTS

| JP | 2017-225067 A | 12/2017 |
| JP | 2017225067 A * | 12/2017 |
| WO | 2008/017857 A1 | 2/2008 |
| WO | 2008/079862 A1 | 7/2008 |

OTHER PUBLICATIONS

Jul. 15, 2020 Office Action in European Patent Application No. 20166469.5.

* cited by examiner

Primary Examiner — Ephrem Z Mebrahtu
(74) Attorney, Agent, or Firm — Venable LLP

(57) ABSTRACT

An imaging device capable of a rotation in a predetermined direction includes a first lens unit having a first optical axis and a first focal length, a first imaging unit to image light passing through the first lens unit; a second lens unit having a second optical axis and a second focal length shorter than the first focal length, a second imaging unit to image light passing through the second lens unit, a dome shaped protection cover disposed on a subject side of the first and the second lens unit and protect the first and the second lens unit, and a support unit for supporting the first and the second lens unit so that an angle at which the first optical axis intersects an inner surface of the protection cover is closer to a vertical angle than an angle at which the second optical axis intersects the inner surface of the protection cover.

14 Claims, 8 Drawing Sheets

IMAGING DEVICE, IMAGING SYSTEM, AND RECORDING MEDIUM

BACKGROUND OF THE INVENTION

Field of the Invention

The present invention relates to an imaging device such as a network camera.

Description of the Related Art

In recent years, network cameras are installed at various places such as platforms of train stations, parking lots, and so on for security purpose. For this kind of purpose, it is needed to obtain a deep depth of focus. In this connection, on one hand, cameras installing a technology referred to as tilt photography are known for deepening the depth of focus of a photography scene, where an imaging plane is rotated to be inclined with respect to a plane perpendicular to an axis of a photography lens for taking a picture. However, it is difficult to quickly focus on an object for network cameras having a pan/tilt rotational control function when performing the tilt photography, since the focusing, the pan/tilt rotational control, and the tilt photography should be properly combined.

On the other hand, Japanese Unexamined Patent Publication No. 2017-225067 proposes that a plurality of lens units having different focal lengths be mounted on an imaging device body and images photographed via the lens units be combined in the compact digital cameras or the field of smartphones. By performing photographing with the plurality of lens units having different focal lengths, it is possible to acquire a video in which a subject is in focus in a wide field angle irrespective of a distance from the lens units to the subject.

It is also possible for network cameras to obtain a video having a deep depth of field by using a plurality of lens units having different focal lengths.

However, when a plurality of lens units of different focal lengths are mounted on a network camera, resolution of a photographed video may degrade since light arriving from a subject passes through a dome cover in a model on which the dome cover is mounted. Therefore, there is a problem that a photographed video degrades depending on a positional relation between the plurality of lens units and the dome cover.

Thus, according to an aspect of the present invention, an objective of the present invention is to provide an imaging device capable of focusing on a subject in a wide field angle and acquiring a video with high quality.

SUMMARY OF THE INVENTION

To achieve the objective, according to an aspect of the present invention, an imaging device capable of a rotation in a predetermined direction includes:

a first lens unit configured to have a first optical axis and a first focal length;

a first imaging unit configured to image light passing through the first lens unit;

a second lens unit configured to have a second optical axis and a second focal length shorter than the first focal length;

a second imaging unit configured to image light passing through the second lens unit;

a dome shaped protection cover disposed on a subject side of the first lens unit and the second lens unit and protect the first lens unit and the second lens unit; and a support unit configured to support the first lens unit and the second lens unit so that an angle at which the first optical axis intersects an inner surface of the protection cover is closer to a vertical angle than an angle at which the second optical axis intersects the inner surface of the protection cover.

Further features of the present invention will become apparent from the following description of exemplary embodiments with reference to the attached drawings.

DESCRIPTION OF THE EMBODIMENTS

Hereinafter, examples of an imaging device according to an embodiment of the present invention will be described with reference to the drawings.

In the examples, a network camera which is applied as an imaging device will be exemplified. However, for example, a digital movie camera, a smartphone with a camera, or a digital still camera including a spherical shaped cover may be applied. An electronic device such as a tablet computer with a camera that has an imaging function can also be applied and an imaging device according to the examples includes them.

Hereinafter, Example 1 of the present invention will be described with reference to the drawings.

Figure 1A:
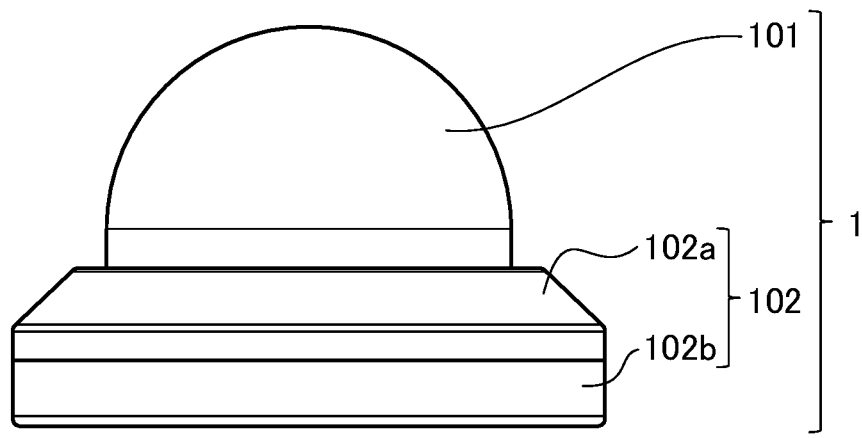
FIGS. 1A and 1B are an external view and an exploded perspective view illustrating a network camera according to Example 1 of the present invention.
Figure 1B:
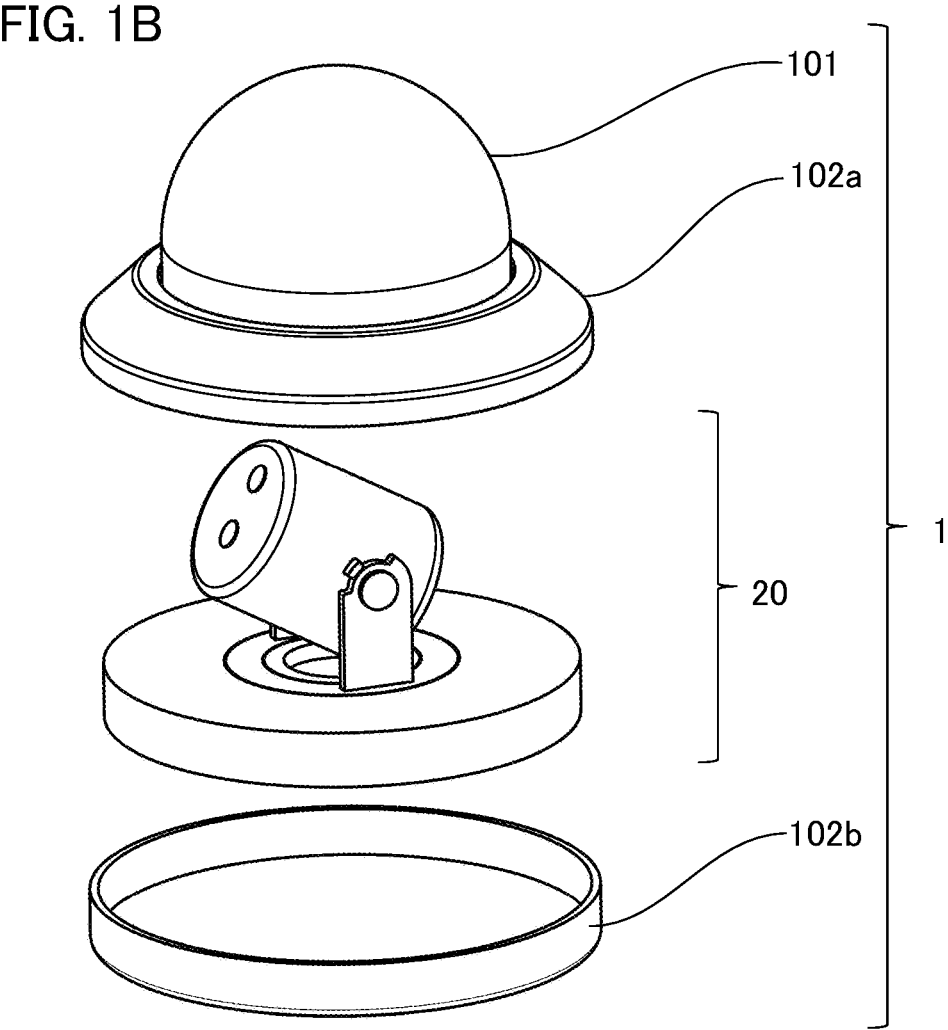

FIG. 1A is an external view illustrating a network camera serving as an imaging device according to Example 1 and FIG. 1B is an exploded perspective view illustrating the network camera illustrated in FIG. 1A.

Example 1

Figure 2:
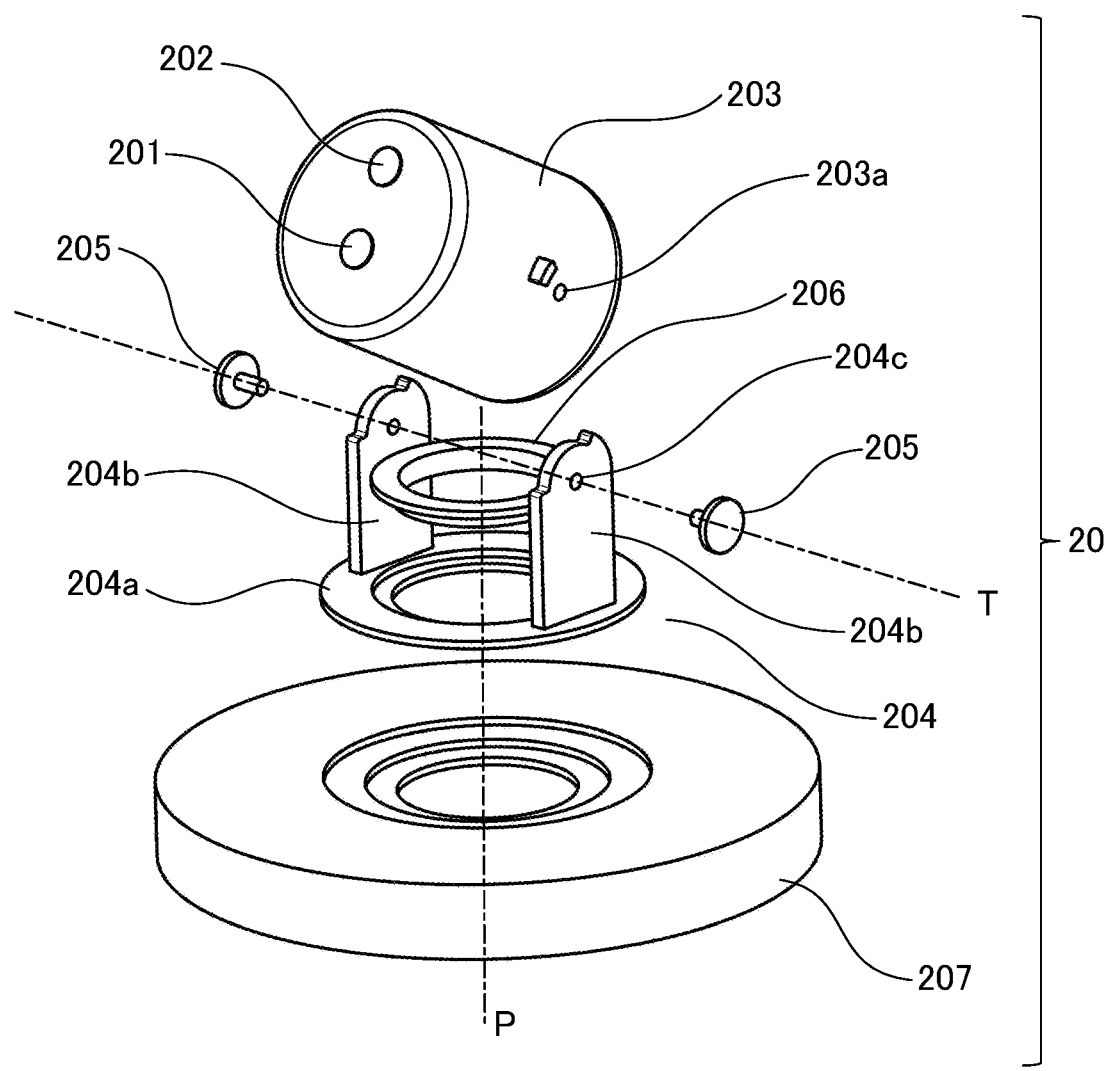
FIG. 2 is an exploded perspective view illustrating an imaging unit according to Example 1 of the present invention.

FIG. 2 is an exploded perspective view illustrating an imaging unit 20 according to Example 1.

In the example, a network camera included in an imaging system that is connected to a server such as an external video management center or a client device (a control device) to communicate with the server or the client device in a wired or wireless manner and the server or the client device manages a photographed video will be exemplified. However, the present invention is not limited thereto.

The network camera 1 according to the example includes a casing 102, a dome (shaped) cover 101 serving as a protection cover, and the imaging unit 20, as illustrated in FIG. 1. The casing 102 includes a first casing 102a that supports the dome cover 101 and another second casing 102b. Inside the casing 102, a print circuit board (not illustrated) is provided. On the print circuit board, a video processing engine, a communication processing engine, a memory, a power supply system IC, and the like are arranged.

On the print circuit board, an RJ45 connector, an external input/output connector, a power supply connection connector, a sound input/output connector, a video-out connector, and an external memory connector such as an SD card are mounted as external interfaces.

The dome cover 101 is a protection cover that is disposed on a side in front (subject side) in a photographable range of a first lens unit 201 and a second lens unit 202 (see FIG. 2) of the imaging unit 20 and is formed of a transparent member protecting the first lens unit 201 and the second lens unit 202.

The dome cover 101 serving as the protection cover has a substantially hemispherical shape (a dome shape) and is formed of a resin such as polycarbonate (PC) or glass. Here, the protection cover may not have a complete hemispherical shape or may have a partially spherical shape. Alternatively, the protection cover may be formed with a polyhedron. A protection cover according to the example is included in the protection cover.

Inside the dome cover 101 and the casing 102, electronic components such as a heater, a microphone, a speaker, an LED, and a motor (none of which is illustrated) are provided, and the electronic components are connected via electric cables, FPC, FFC, or the like.

As illustrated in FIG. 2, the imaging unit 20 includes a first lens unit 201, a second lens unit 202, a lens unit support member 203 serving as a support unit, a main base 207, a pan base 204, a tilt fixing member 205, and a pan fixing member 206. Each of the first lens unit 201 and the second lens unit 202 includes a lens group, a lens holder, a print circuit board, and an imaging element (none of which is illustrated) and is fixed to the lens unit support member 203 by a screw (not illustrated) or the like.

A first optical axis 201a (see FIG. 3) of the first lens unit 201 is substantially parallel to a second optical axis 202a (see FIG. 3) of the second lens unit 202 and the optical axes are both single focal lenses.

The main base 207 is disposed inside the casing 102 and is fixed to the second casing 102b by a screw (not illustrated). The main base 207 has a circular opening in which the pan base 204 is disposed at the center. The pan base 204 supports the lens unit support member 203. The pan fixing member 206 (a pan support member) is supported and fixed so that the pan base 204 is rotatable about a pan rotation axis P in a pan direction with respect to the main base 207. The pan base 204 includes a ring portion 204a and one pair of support units 204b protruding from the ring portion 204a to the top of the dome cover 101.

As a structure supporting and fixing the pan base 204 so that the pan base 204 can be panned with respect to the main base 207, there is a structure in which fixing is realized with a component that has an elastic force, such as a waved washer or a metal plate (not illustrated), a screw, or an engagement structure in which a gear is used, or the like. The tilt fixing member 205 (a tilt support member) supports and fixes the lens unit support member 203 so that the lens unit support member 203 is rotatable about a tilt rotation axis T with respect to the pan base 204 in a tilt direction.

As the structure supporting and fixing the lens unit support member 203 so that the lens unit support member 203 can be tilted with respect to the pan base 204, there is a structure in which a holding force is exerted using a screw, a plain washer, or a spring washer, a structure in which a holding force is exerted with an elastic body interposed therebetween, or the like. The pan rotation axis P and the tilt rotation axis T are configured to pass through an approximate center 101a (see FIG. 3) of the hemispherical dome cover 101. Thus, the lens unit support member 203 can perform pan rotation and tilt rotation while maintaining a given positional relation with an inner surface of the dome cover 101 by using the approximate center 101a of the dome cover 101 as an axis.

In the above-described configuration, the first lens unit 201 and the second lens unit 202 can photograph any direction around the network camera 1 in accordance with a motion of the pan rotation or the tilt rotation of the lens unit support member 203.

Figure 3:
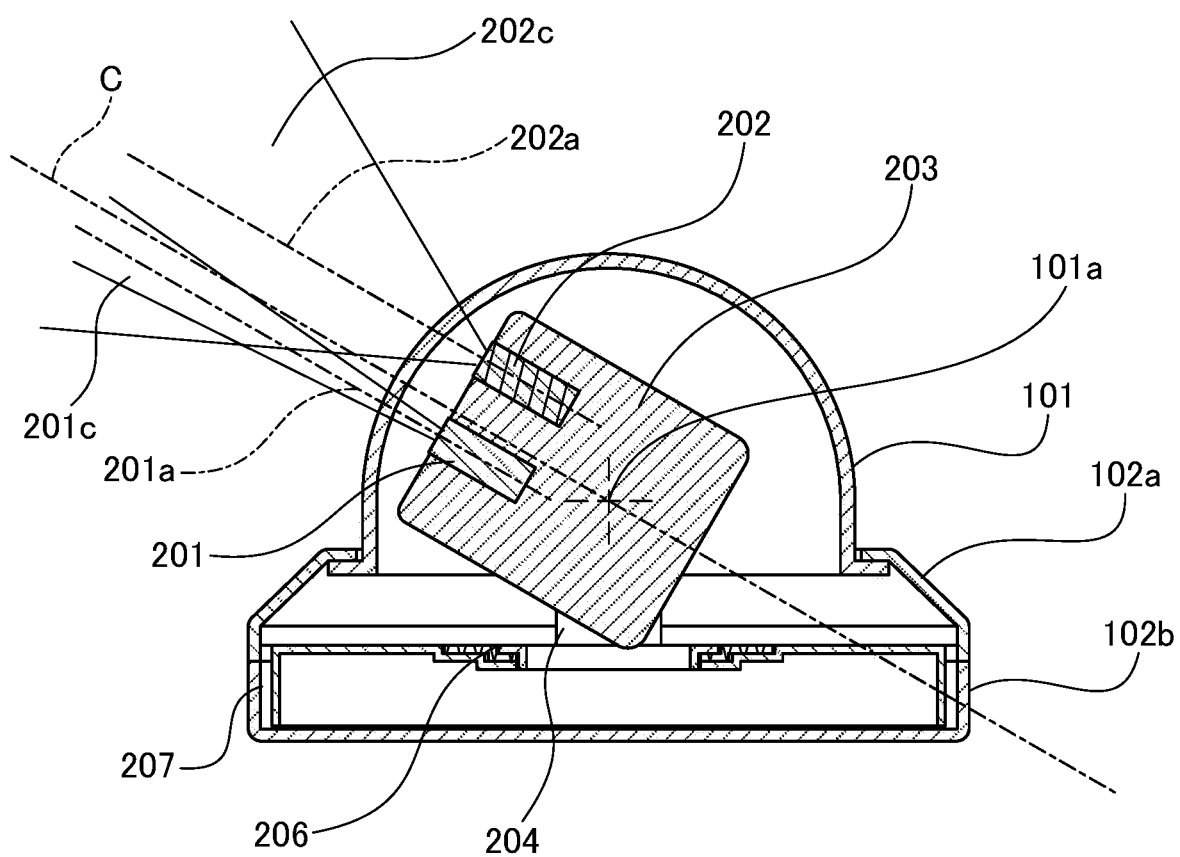
FIG. 3 is a sectional view illustrating a network camera and a diagram illustrating field angles of first and second lens units according to Example 1 of the present invention.

FIG. 3 is a sectional view illustrating the network camera 1 and a diagram illustrating field angles (i.e., angles of the fields of view) of a first lens unit 201 and a second lens unit 202 according to Example 1.

Figure 4:
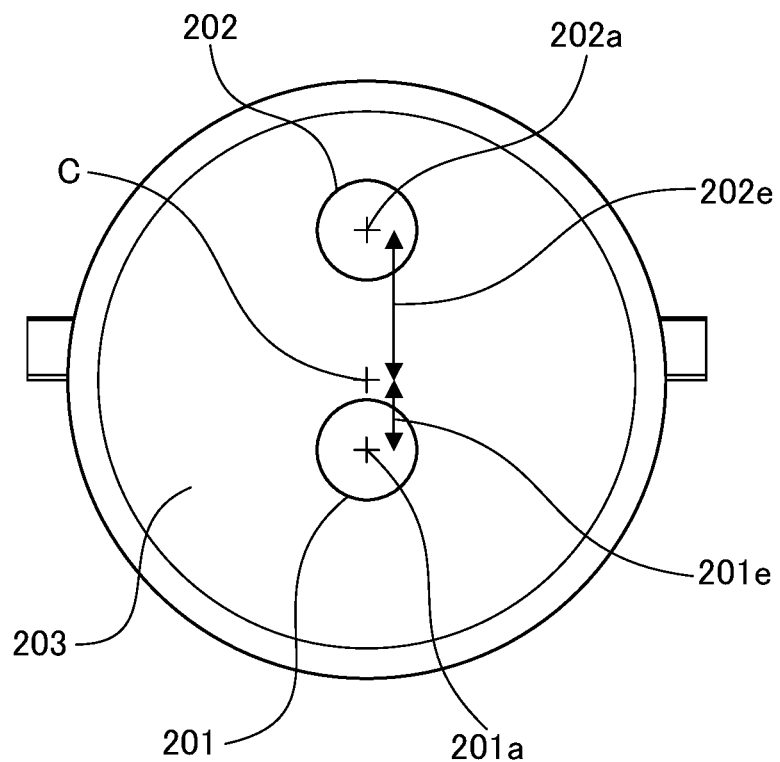
FIG. 4 is a diagram illustrating a lens unit support member when viewed from a subject side according to Example 1 of the present invention.

FIG. 4 is a diagram illustrating the lens unit support member 203 when viewed from a subject side according to Example 1.

The first lens unit 201 and the second lens unit 202 are single focal lenses of different focal lengths. The first lens unit 201 and the second lens unit 202 may be so-called variable focal length lenses of which focal lengths are variable rather than single focal lenses. A first focal length 201b of the first lens unit 201 is longer than a second focal length 202b of the second lens unit 202. A first field angle 201c of the first lens unit 201 is narrower than a second field angle 202c of the second lens unit 202.

In other words, in a relationship between the lens units, the first lens unit 201 is a telephoto lens and the second lens unit 202 is a wide angle lens. A first video 201d is obtained when the first imaging unit picks up images light passing through the first lens unit 201. A second video 202d is obtained when the second imaging unit picks up images light passing through the second lens unit 202. Since both the lens units have different focal lengths, subject distances for being in focus within a photographing range are different.

In the example, since the first optical axis 201a is substantially parallel to the second optical axis 202a, there is a relation in which the first field angle 201c is substantially contained in the second field angle 202c. In addition, since the first video 201d is an image from the telephoto lens, the first video 201d is focused on a relatively distant subject. Since the second video 202d is an image from a wide angle lens, the second video 202d is focused on a relatively close subject. Therefore, by combining the first video 201d and the second video 202d through video processing, it is possible to obtain a video which is in focus in a wide field angle.

On the other hand, a network camera on which a dome cover is generally mounted and the resolution of a photographed video degrades since light passes through the dome cover is known. As an angle of incidence at which the light passing through the dome cover is incident on the dome cover increases, the resolution degrades. That is, the most effective method of suppressing deterioration in the resolution is a method of disposing an optical axis of a lens unit so that the optical axis passes through the center of the sphere of the dome cover.

Therefore, when an axis which is parallel to the first optical axis and passes through the center 101a of the dome cover is defined as a central axis C of the dome cover, it is preferable that the optical axis of the lens unit be aligned with the central axis C of the dome cover ideally. However, when the plurality of lens units are fixed to the lens unit support member as in the example, it is physically difficult to realize a structure in which optical axes of all the lens units are aligned with the central axis of the dome cover. On the other hand, it is known that a telephoto lens with a narrow field angle is more easily influenced by an angle of incidence of light passing through the dome cover than a wide angle lens with a large field angle, and resolution is more likely to be degraded.

Accordingly, in the example, the first optical axis 201a with a narrow field angle is set to be closer to the central axis C of the dome cover than the second optical axis 202a with a larger field angle. In this state, the first lens unit 201 and the second lens unit 202 are configured to be supported and fixed to the lens unit support member 203.

Further, relations between the first optical axis 201a, the second optical axis 202a, and the central axis C of the dome cover will be described with reference to FIG. 4. A distance between the first optical axis 201a and a line parallel to the first optical axis 201a passing through the central axis C of the dome cover is defined as a first inter-optical axis distance 201e, and a distance between the second optical axis 202a and a line parallel to the second optical axis 202a passing through the central axis C of the dome cover is defined as a second inter-optical axis distance 202e. The first lens unit 201 and the second lens unit 202 are fixed to the lens unit support member 203 so that the first inter-optical axis distance 201e is shorter than the second inter-optical axis distance 202e, as described with reference to FIG. 3. Thus, the first lens unit 201 which is more easily influenced by the dome cover than the second lens unit 202 can perform photographing with higher quality.

In the first lens unit 201 and the second lens unit 202, the first optical axis and the second optical axis are disposed on opposite sides with respect to the first plane passing through the tilt rotation axis and the central axis of the dome cover when viewed on the first plane, as in FIG. 4. Since the support unit supports the first lens unit and the second lens unit in this positional relation, vignetting is small.

As described above, the protection cover may not have a sphere shape and may have a polyhedron shape or the like. Even when the protection cover has not a sphere and a part of the protection cover is planar, an angle at which the first optical axis 201a intersects the inner surface of the protection cover may be closer to a perpendicular angle than an angle at which the second optical axis 202a intersects the inner surface of the protection cover. The first optical axis 201a and the second optical axis 202a may not be supported parallel to each other.

As described above, in Example 1, when the plurality of lens units with different focal lengths are mounted, the deterioration in a combined video of a plurality of photographed videos is suppressed as much as possible in the entire network camera system, and thus photographing with high quality can be realized.

Example 2

Figure 5:
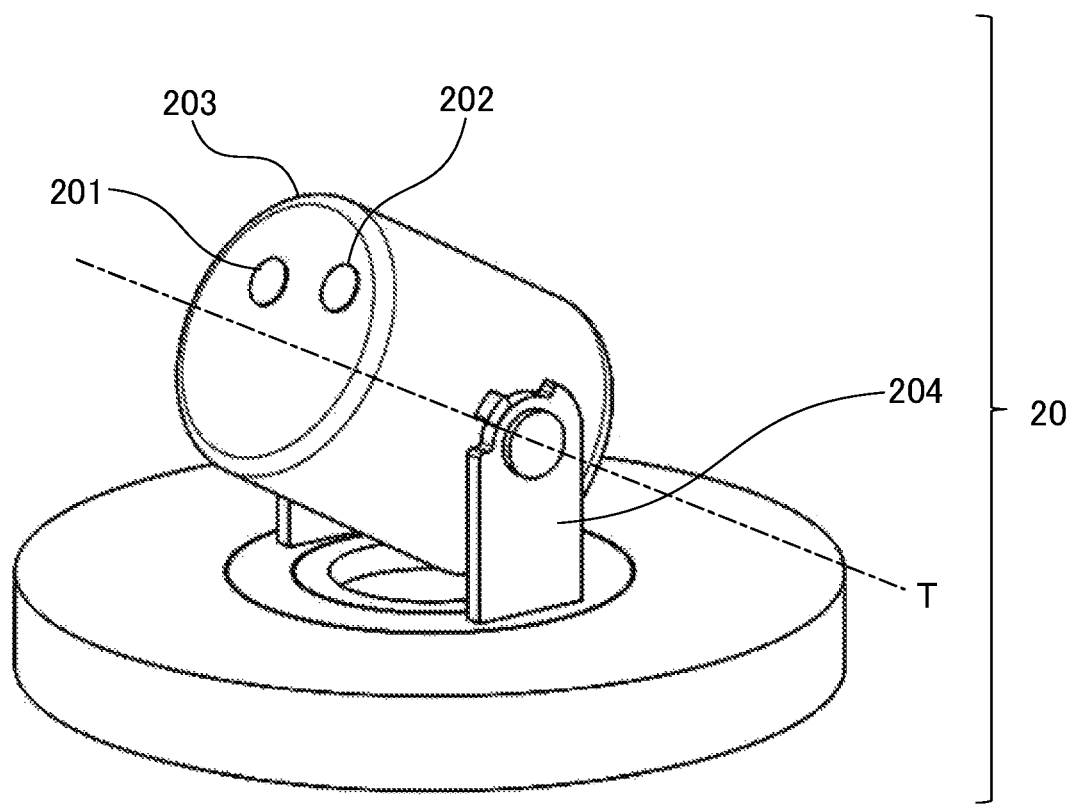
FIG. 5 is a perspective view illustrating an imaging unit according to Example 2 of the present invention.

Next, FIG. 5 is a perspective view illustrating the imaging unit 20 according to Example 2 of the present invention.

Figure 6:
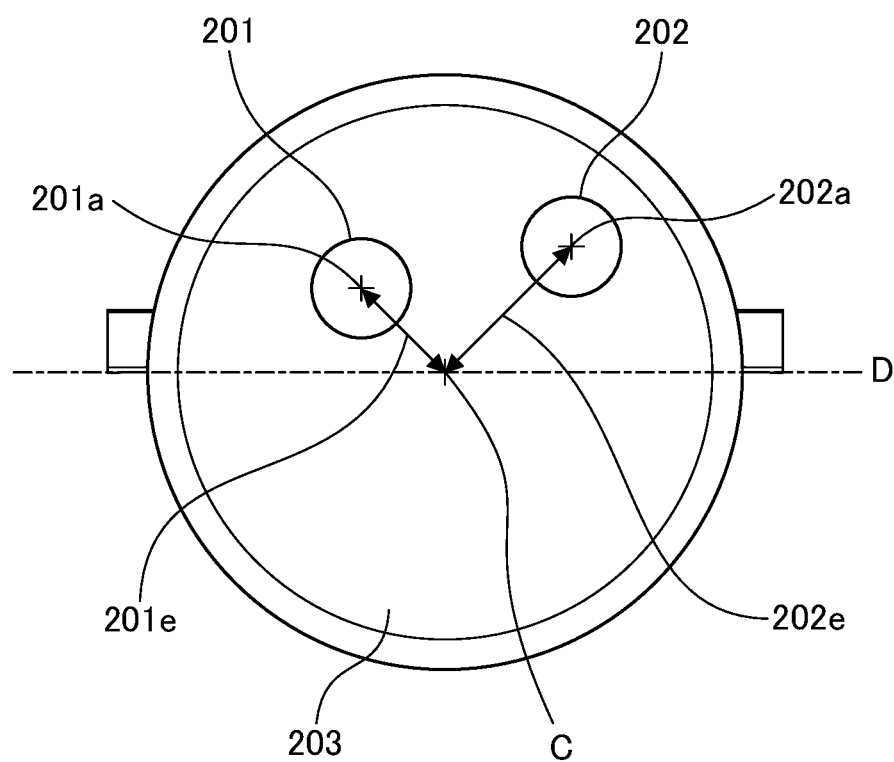
FIG. 6 is a diagram illustrating a lens unit support member when viewed from a subject side according to Example 2 of the present invention.

FIG. 6 is a diagram illustrating the lens unit support member 203 when viewed from a subject side according to Example 2.

According to Example 2, a configuration suitable for suppressing an influence of vignetting caused due to the casing 102 of the first field angle 201c and the second field angle 202c is realized. By increasing a tilt angle of the lens unit support member 203 and suppressing vignetting of the field angle, it is possible to perform photographing of a larger range.

Since a configuration other than the disposition of the first lens unit 201 and the second lens unit 202 is the same as in Example 1, description other than this will be omitted. When the lens unit support member 203 is tilted about a tilt rotation axis T and the first field angle 201c becomes substantially parallel to the second field angle 202c, vignetting occurs in a photographed video due to the casing 102. In Example 2, by contriving a positional relation between the first lens unit 201 and the second lens unit 202 on the lens unit support member 203, it is possible to increase a tilt angle in a state in which there is no vignetting at the first field angle 201c and the second field angle 202c.

Here, to describe Example 2, a plane formed to pass through the tilt rotation axis T and the central axis C of the dome cover is defined as a first plane D. The first lens unit 201 and the second lens unit 202 are disposed on the same side with respect to the tilt rotation axis T of the first plane D on the lens unit support member 203. That is, as in FIG. 6, the first lens unit 201 and the second lens unit 202 are supported and fixed to the lens unit support member 203 so that the first optical axis 201a and the second optical axis 202a are disposed on the same side with respect to the tilt rotation axis T of the first plane D. At this time, as in Example 1, the first lens unit 201 and the second lens unit 202 are supported and fixed to the lens unit support member 203 so that the first inter-optical axis distance 201e is shorter than the second inter-optical axis distance 202e.

In this way, when the lens unit support member 203 is tilted in an opposite direction to the direction in which the first lens unit 201 and the second lens unit 202 are disposed with respect to the first plane D, it is possible to reduce vignetting caused due to the casing 102 at the first field angle 201c and the second field angle 202c. Accordingly, it is possible to increase a tilt angle at which tilt rotations are possible.

As described above, by disposing the first lens unit 201 and the second lens unit 202 only on the same side on the lens unit support member 203 in a tilt rotation direction, it is possible to increase an angle at which tilt rotation is possible and broaden a photographable range.

Example 3

Figure 7:
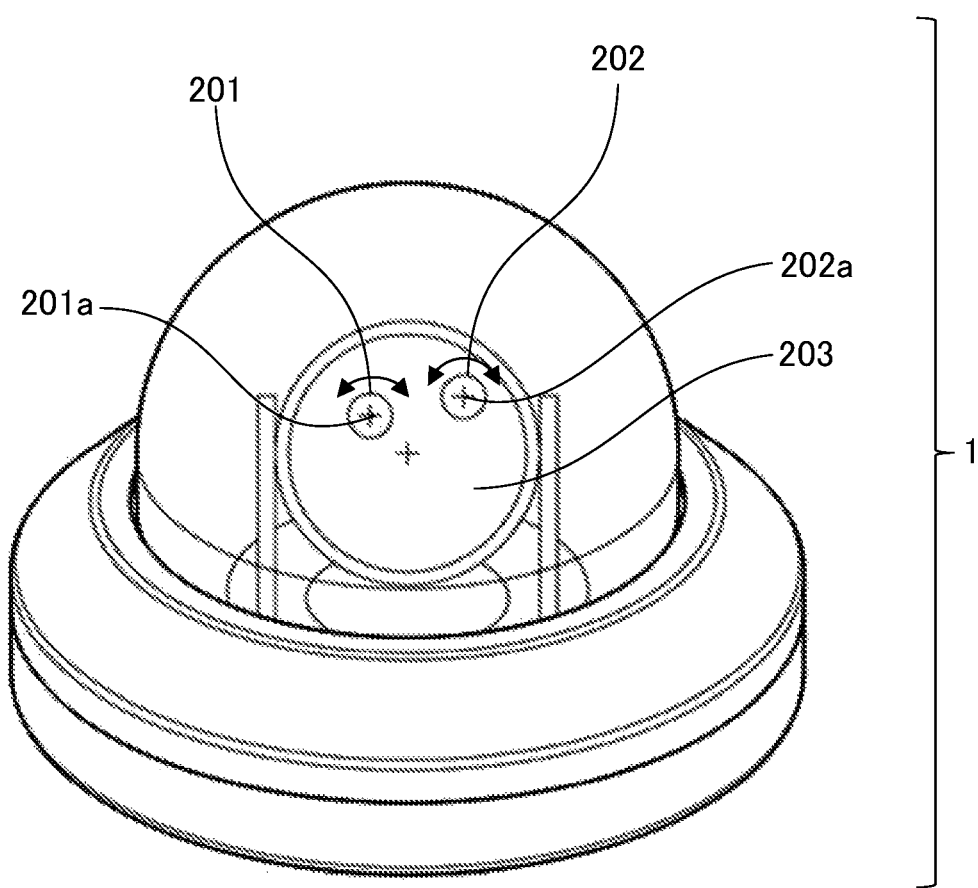
FIG. 7 is an external view illustrating a network camera when viewed from a subject side according to Example 3 of the present invention.

FIG. 7 is an external view illustrating the network camera 1 when viewed from a subject side according to Example 3 of the present invention.

In general, an angle of a photographed video is changed in a network camera on which a dome cover is mounted. Therefore, a structure in which a lens unit can be rotated about an optical axis of the lens unit with respect to a pan base is used in many cases. In the case of the configuration according to Example 2 described with reference to FIGS. 5 and 6, when the lens unit support member 203 is rotated, the first field angle 201c and the second field angle 202c are closer to the casing 102, and thus vignetting occurs. Therefore, a tilt angle of the lens unit support member 203 cannot be increased.

Accordingly, in the example, the first lens unit 201 is configured to be rotatable about the first optical axis 201a with respect to the lens unit support member 203 without rotating the lens unit support member 203 with respect to the pan base 204. Alternatively, the second lens unit 202 is configured to be rotatable about the second optical axis 202a with respect to the lens unit support member 203. Further, the first lens unit 201 and the second lens unit 202 may be configured to be rotatable about the first optical axis 201a and the second optical axis 202a with respect to the lens unit support member 203.

In order to support and fix the first lens unit 201 and the second lens unit 202 so that the first lens unit 201 and the second lens unit 202 are rotatable with respect to the lens unit support member 203, there is a structure in which fixing is realized with a component that has an elastic force, such as a waved washer or a metal plate, a screw, or an engagement structure in which a gear is used, or the like. In such a configuration, the first lens unit 201 and the second lens unit 202 are set to be rotatable. A tilt angle at which the lens unit support member 203 can be tilted without causing vignetting can be increased, and thus it is possible to photograph a wide range.

Figure 8:
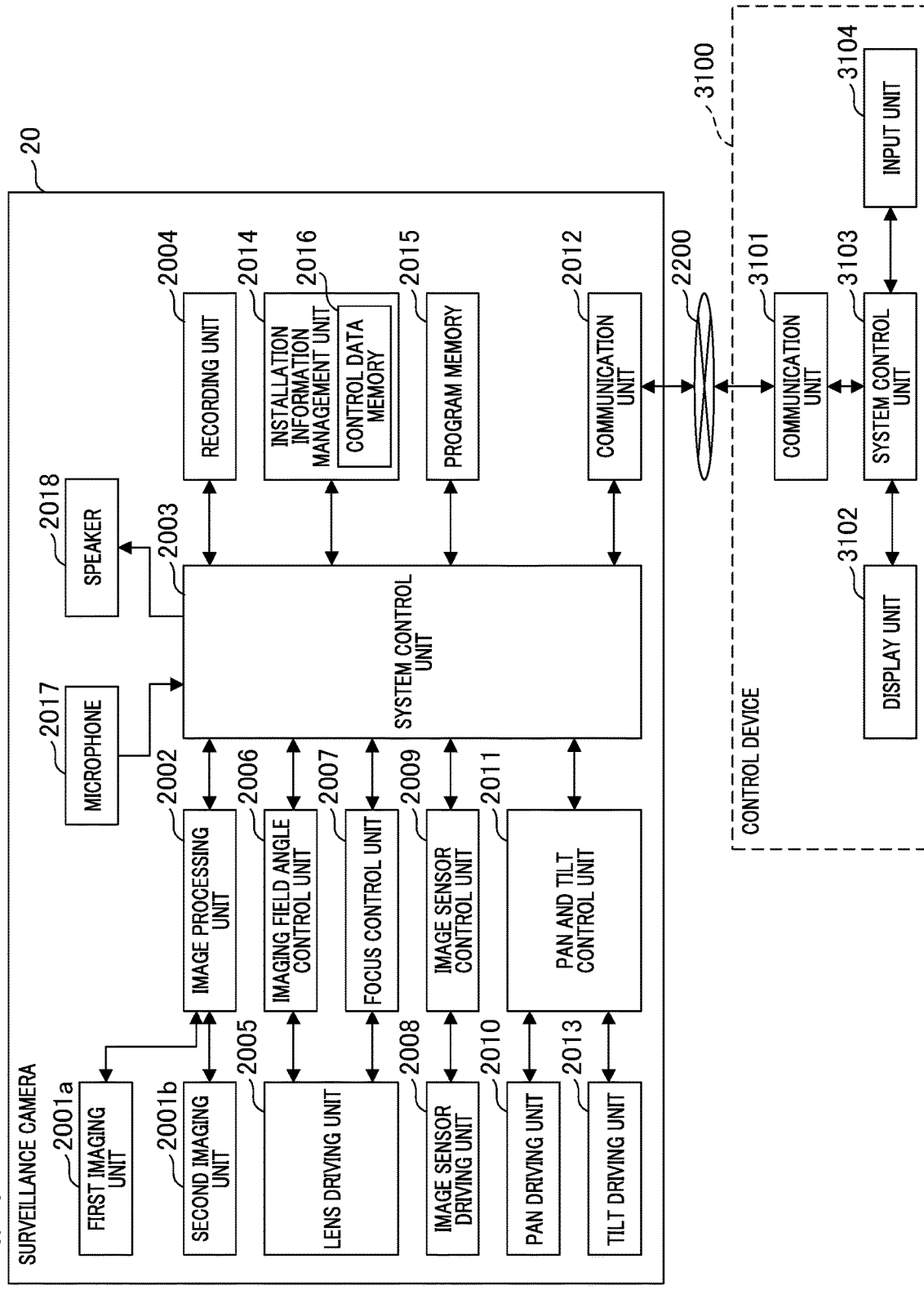
FIG. 8 is a block diagram illustrating a configuration example of a system including an imaging unit according to an example of the present invention.

FIG. 8 is a diagram illustrating a configuration of a system including the imaging unit 20 according to the example. Reference numerals 2001a and reference numeral 2001b respectively denote a first imaging unit and a second imaging unit which include image sensors that receive light via the first lens unit 201 and the second lens unit 202. The image sensor may be, for example, a CMOS image sensor, and receives subject light and converts the subject light into an electric signal.

Reference numeral 2002 denotes an image processing unit and Reference numeral 2003 denotes a system control unit that contains a CPU serving as a computer and performs various operations based on computer programs stored in a program memory 2015. Reference numerals 2004 and 2005 respectively denote a recording unit and a lens driving unit that drive diagrams, field angles, focus, or the like of the first lens unit 201 and the second lens unit 202.

Reference numeral 2006 denotes an imaging field angle control unit that outputs a signal for controlling each field angle when the first lens unit 201 and the second lens unit 202 are types of units that can vary the field angles.

Reference numeral 2007 denotes a focus control unit that outputs a signal for controlling each focus when the first lens unit 201 and the second lens unit 202 are types of units that can adjust focus. Reference numerals 2008 and 2009 respective denote an image sensor driving unit and an image sensor control unit that controls driving timings or the like of the first imaging unit and the second imaging unit. Reference numeral 2010 denotes a pan driving unit, reference numeral 2013 denotes a tilt driving unit, reference numeral 2011 denotes a pan and tilt control unit, reference numeral 2012 denotes a communication unit, reference numeral 2017 denotes a microphone, and reference numeral 2018 denotes a speaker.

The imaging unit 20 and a control device 3100 are connected so that the imaging unit 20 and the control device 3100 can communicate with each other via a network 2200. The communication unit 2012 functions as a communication unit that transmits signals for controlling the first lens unit and the second lens unit to the imaging device. The imaging device, the control device, and the like are included in an imaging system.

Configurations and main functions of the units of the imaging unit 20 will be described with reference to FIG. 8.

The image processing unit 2002 performs imaging, predetermined image processing on photoelectrically converted signals, a video inversion process, a compression encoding process, and the like to generate a first video 201d and a second video 202d in the first imaging unit 2001a and the second imaging unit 2001b, respectively. Here, the video inversion process is a process of rotating a video at 90 degrees, 180 degrees, 270 degrees, or the like. By causing the image processing unit 2002 to combine the first video 201d and the second video 202d, it is possible to acquire a video which is in focus within a range of a large photographing field angle. The image processing unit 2002 functions as a combination processing unit in this case.

It is needless to say that the control device 3100 could alternatively performs the combination process. In this case, the control device 3100 functions as the combination processing unit. In this case, the control device is connected to the imaging device and includes a combination unit that combines an output signal of the first imaging unit and an output signal of the second imaging units of the imaging device.

The system control unit 2003 analyzes a camera control command transmitted from the control device 3100 and performs a process in accordance with a command.

The recording unit 2004 records a video and various kinds of data on an internal storage or an external storage.

The pan and tilt control unit 2011 commands the pan driving unit 2010 and the tilt driving unit 2013 to change panning and tilting based on set values of the panning and the tilting delivered from the system control unit 2003.

The communication unit 2012 delivers video data to the control device 3100 via the network 2200. The communication unit 2012 receives various commands transmitted from the control device 3100 and delivers the commands to the system control unit 2003.

An installation information management unit 2014 manages information such as a tilt angle appropriate in an installation orientation or an installation orientation of a camera. The installation information management unit 2014 contains a limited data memory 2016 serving as a limited data storage unit. Data for limiting a tilt angle range is stored in the limited data memory 2016.

In general, a general-purpose computer such as a personal computer is used as the control device 3100.

A liquid crystal display device or the like is used as a display unit 3102. The display unit 3102 displays an image acquired from the imaging unit 20 and displays a GUI for performing camera control.

A system control unit 3103 performs various operations based on computer programs stored in a program memory (not illustrated), generates camera control commands, for example, in response to GUI operations by a user, and transmits the camera control commands to the imaging unit 20 via the communication unit 3101.

The system control unit 3103 displays video data received from the imaging unit 20 via the communication unit 3101 and data indicating set values of an imaging field angle including zoom, focus, a tilt angle, and panning and tilting on the display unit 3102.

As an input unit 3104, a pointing device such as a keyboard, a mouse, or a touch panel is used. A user of a client device operates a GUI through the input unit 3104.

As described with reference to FIGS. 1A to 8, according to the examples of the present invention, a subject can be focused in a range of a large photographing field angle and a video with high quality can be acquired in the network camera that includes the plurality of lens units and the dome cover.

The case in which photographing wavelengths of the first lens unit (including the image sensor) and the second lens unit (including the image sensor) are the same and visible light is photographed has been described above. However, a lens unit (including an image sensor) with a photographing wavelength of invisible light may be used. Photographing wavelength bands of the first lens unit (including the image sensor) and the second lens unit (including the image sensor) may be different from each other.

The example in which the first lens unit 201 and the second lens unit 202 are the single focal lenses has been described above, but at least one of the first lens unit 201 and the second lens unit 202 may be a variable focal length lens. In this case, for example, a middle focal length of a range of an adjustable focal length of the first lens unit 201 is set as a first focal length 201b. For example, a middle focal length of a range of an adjustable focal length of the second lens unit 202 is set as a second focal length 202b. In this case, similar effects are exerted when the first focal length 201b is longer than the second focal length 202b. Alternatively, only one of the lens units may be a focal length variable lens. Alternatively, similar effects are exerted when the shortest focal length of an adjustable focal length range of the first lens unit 201 is longer than the shortest focal length of the second lens unit 202.

The configurations of the present invention are not limited to the network cameras exemplified in the foregoing examples and materials, shapes, dimensions, forms, numbers, disposition portions, and the like can be appropriately changed within the scope of the present invention without departing from the gist of the present invention.

A computer program realizing the functions of the above-described examples in some or all of the controls in the examples may be supplied to an imaging device or an imaging system via a network or various storage media. A computer (or a CPU, an MPU, or the like) in the imaging device or the imaging system may read and execute the program. In this case, the program and a storage medium storing the program are included in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-76846 filed on Apr. 15, 2019, which is hereby incorporated by reference herein in its entirety.

What is claimed is:

1. An imaging device capable of a rotation in a predetermined direction, the imaging device comprising:
    a first imaging unit configured to capture a first image, the first imaging unit comprising a first lens unit having a first optical axis and a first focal length;
    a second imaging unit configured to capture a second image, the second imaging unit comprising a second lens unit having a second optical axis and a second focal length shorter than the first focal length;
    a compositing unit configured to generate a composite image by performing compositing processing for combining the first image and the second image;
    a dome shaped protection cover disposed on a subject side of the first lens unit and the second lens unit and protect the first lens unit and the second lens unit; and
    a support unit configured to support the first lens unit and the second lens unit so that an angle at which the first optical axis intersects an inner surface of the protection cover is closer to a perpendicular angle than an angle at which the second optical axis intersects the inner surface of the protection cover,
    wherein the support unit is capable of rotation, and
    wherein the support unit is configured to support the first lens unit and the second lens unit while maintaining the distance between the first lens unit and the second lens unit.

2. The imaging device according to claim 1, wherein the rotation of the support unit includes a tilt rotation.

3. The imaging device according to claim 1, wherein at least part of the protection cover includes at least a portion of a spherical shape having a center point.

4. The imaging device according to claim 3, wherein the first optical axis is parallel to the second optical axis and parallel to a central axis of the dome shaped protective cover passing through the center point of the dome-shaped protection cover, and
    wherein a distance between the first optical axis and the central axis is shorter than a distance between the second optical axis and the central axis of the dome cover.

5. The imaging device according to claim 3, further comprising:
    a tilt support member configured to support the support unit so that tilt rotation about a tilt rotation axis is possible; and
    a pan support member configured to support the tilt support member so that pan rotation about a pan rotation axis is possible,
    wherein the tilt rotation axis and the pan rotation axis pass through the center point of the dome-shaped protection cover.

6. The imaging device according to claim 5, wherein the support unit supports the first lens unit and the second lens unit so that the first optical axis and the second optical axis are disposed on the same side with respect to a first plane passing through the tilt rotation axis and the central axis of the dome cover when viewed on the first plane.

7. The imaging device according to claim 1, wherein the first lens unit is supported by the support unit to be rotatable about the first optical axis.

8. The imaging device according to claim 1, wherein the second lens unit is supported by the support unit to be rotatable about the second optical axis.

9. The imaging device according to claim 1, wherein the protection cover is formed of a transparent material.

10. The imaging device according to claim 1, wherein a photographing wavelength of the first lens unit is different from a photographing wavelength of the second lens unit.

11. The imaging device according to claim 1, wherein a photographing wavelength of the first lens unit is the same as a photographing wavelength of the second lens unit.

12. The imaging device according to claim 1, wherein a focal length of at least one of the first lens unit and the second lens unit is variable.

13. The imaging device according to claim 1, wherein focal lengths of the first lens unit and the second lens unit are variable, and
    wherein a focal length of a median of an adjustable focal length range of the first lens unit is longer than a focal length of a median of an adjustable focal length range of the second lens unit.

14. The imaging device according to claim 4, wherein the support unit supports the first lens unit and the second lens unit so that the first optical axis and the second optical axis are disposed on opposite sides with respect to a first plane passing through the tilt rotation axis and the central axis of the dome cover when viewed on the first plane.

\* \* \* \* \*